2,925,362

BUNTE SALT-SULFIDE COMPOSITION IN AGRICULTURAL SPRAYS

Edward M. Fettes, Morrisville, and Morris B. Berenbaum, Levittown, Pa., assignors to Thiokol Chemical Corporation, Trenton, N.J., a corporation of Delaware No Drawing. Application August 11, 1954
Serial No. 449,246

9 Claims. (Cl. 167—43)

This invention relates to agricultural spray materials. More particularly the invention relates to a novel composition that is adapted to be mixed with water and used as an agricultural spray on the foliage of plants and trees in conjunction with conventional insecticides, fungicides, phytotoxins, animal repellents and the like to protect these latter materials against erosion due to weather conditions and thereby lengthen their effective life. This application is a continuation-in-part of our prior application Serial No. 378,673, filed September 4, 1953, now abandoned.

One of the principal problems that arises in connection with the use of insecticides, fungicides, etc. particularly those that are deposited from water or organic solvent solution or dispersion is the relatively short effective life of these materials due to the fact that they tend to be removed from the plant foliage by rain, wind and other climatic factors. It is a general object of the present invention to provide a protective coating for such materials that is firmly adherent to the foliage of plants and trees and adapted to be applied to the foliage to prevent insecticides, fungicides and the like from being washed therefrom by rain, thereby prolonging the period during which they are effective. It is another object of the invention to provide a material that can be readily mixed with water and sprayed on to foliage to form a protective coating of the type and for the purposes described above. It may be noted that the spray coating of the present invention can be used over a previously applied layer of the insecticides or can be incorporated in the insecticide to improve its adherence to the foliage, and in either case will protect the insecticide, fungicide, etc. from erosion. It is still another object of the invention to provide a protective material of this type that is a substantially dry solid which can be readily stored or transported and which can be converted to a dispersed form at the point of use merely by addition to water.

The composition of the present invention incorporates as one of its principal ingredients a so-called "Bunte" salt or compound analogous to a "Bunte" salt. As conductive to a clear understanding of the present invention it may be pointed out that the "Bunte" salts are water soluble organic thiosulfate compounds that may be readily prepared by reacting organic monohalides and polyhalides with water soluble inorganic thiosulfates, e.g. by refluxing 5°–120° C. the organic halide with an aqueous solution of an inorganic thiosulfate. The halogen of the compound is preferably attached to an aliphatic (alkylene) carbon atom and when there is more than one atom each halogen must be attached to a carbon atom. The halogen atom (or atoms) is replaced with a thiosulfate radical, e.g. $S_2O_3Na$ when the thiosulfate used is sodium thiosulfate.

In its broader aspects the composition of the invention comprises a substantially dry mixture of thiosulfate which may be prepared in the manner indicated above, and a reagent selected from the group consisting of alkali metal and alkaline earth metal monosulfides, polysulfides and hydrosulfides. It has been found that organic thiosulfate compounds react in aqueous solution very quickly with alkali metal monosulfides, polysulfides and hydrosulfides to produce organic disulfides or polysulfides. When a dry mixture of organic thiosulfate and alkaline sulfide are added to water there is an immediate reaction at room temperature, e.g. 25° C., and the reaction product is formed as an aqueous suspension or latex of organic polymeric polysulfide. It has been found that such a suspension may be sprayed on foliage etc. which has been previously treated with an insecticide or fungicide and has the property of protecting the insecticide or fungicide from the erosion to which it otherwise would be subjected. Moreover, it has been found that the protective action of the polymeric polysulfide may be obtained by incorporating with the polysulfide suspension a solution or suspension of a conventional insecticide or fungicide and using the composite product thus obtained as a material which may be applied in a single spraying operation. Also the dry mixture of organic thiosulfate and alkaline sulfide can be premixed with a suitable insecticide or fungicide, and then added to water at the point of use to provide a spray solution or suspension containing both the insecticide or fungicide and the material to cause it to adhere to the foliage.

While we do not wish to be bound by any particular theory of operation of the present invention, it is our belief that the reaction between the organic thiosulfate and alkaline sulfide involves a scission of the S—SO₃ bond in the organic thiosulfate with the rejoining of the fragments to give the products indicated below. The reaction may be summed up in the following equations wherein R represents the organic radical of the organic thiosulfate, the nature of which is described more fully hereafter, and various different sulfide reagents are used to illustrate different species of the reaction.

$2R(S_2O_3Na)_2 + 2NaSH \rightarrow$ —RSSRSS—
$\qquad + 2Na_2S_2O_3 + 2NaHSO_3$
$2R(S_2O_3Na)_2 + 2NaSNa \rightarrow$ —RSSRSS—
$\qquad + 2Na_2S_2O_3 + 2Na_2SO_3$
$2R(S_2O_3Na)_2 + 2NaS_2Na \rightarrow$ —RSSRSS— $+ 4Na_2S_2O_3$
$2R(S_2O_3Na)_2 + 2NaS_3Na \rightarrow$ —RS_3RS_3— $+ 4Na_2S_2O_3$
$2R(S_2O_3Na)_2 + 2NaS_4Na \rightarrow$ —RS_4RS_4— $+ 4Na_2S_2O_3$ As indicated above, the foregoing reactions proceed very rapidly at room temperature. Hence whatever the mechanism of these reactions may be it seems clear that they are quite different from the known reaction between an organic halide or material with labile groups and an alkali metal polysulfide. In the latter type of reaction, the C—X bond is broken where X is halogen or other labile group and this reaction is known to proceed quite slowly at room temperature. Hence it seems clear that the reaction between the organic thiosulfate and the alkali metal sulfide according to the above equations is fundamentally different from the known reaction between organic halides and alkali metal polysulfides.

The organic radical of the organic thiosulfate is desirably either an aliphatic hydrocarbon or oxahydrocarbon radical, and it is preferable that at least the major proportion of the organic thiosulfate be bi-functional, i.e. that it have the radical $S_2O_3Na$ attached to each of two different methylene carbon atoms. Examples of bi-functional organic thiosulfates useful in the present composition are given in Table I below wherein T indicates thiosulfate radical $S_2O_3Na$.

TABLE I

Thiosulfates of Oxahydrocarbons

A. *Thiosulfates of ethers*

$$TC_2H_4OC_2H_4T$$
$$TC_2H_4OC_2H_4OC_2H_4T$$

$$\begin{array}{c} TC_2H_4O \\ \phantom{xx} \\ TC_2H_4O \end{array} \!\!\! \diagdown \!\! CHCH \!\! \diagup \!\!\! \begin{array}{c} OC_2H_4T \\ \phantom{xx} \\ OC_2H_4T \end{array}$$

$$TC_2H_3(CH_3)OC_2H_3(CH_3)T$$

B. *Thiosulfates of formals*

$$TC_2H_4OCH_2OC_2H_4T$$
$$TC_2H_4OCH_2OC_2H_4OCH_2OC_2H_4T$$

$$\begin{array}{l} CH_2OCH_2OC_2H_4T \\ | \\ CHOCH_2OC_2H_4T \\ | \\ CH_2OCH_2OC_2H_4T \end{array}$$

$$\begin{array}{c} TCH_2 \\ \phantom{xx} \\ TCH_2 \end{array} \!\!\! \diagdown \!\! CHOCH_2OCH \!\! \diagup \!\!\! \begin{array}{c} CH_2T \\ \phantom{xx} \\ CH_2T \end{array}$$

Thiosulfates of Hydrocarbons $$TC_2H_4T$$
$$TC_3H_6T$$
$$TCHCH_3T$$
$$\phantom{TC}|\phantom{CH_3T}$$
$$\phantom{TCHC}CH_3$$

$$TC_nH_{2n}T$$

$n$ from 3 to about 10.

It has been found that mixtures of the foregoing thiosulfates can be used as well as individual compounds. As indicated above, it is preferable that bi-functional thiosulfates be used and where mixtures of thiosulfates are used at least a major proportion of the organic thiosulfate should be bi-functional. On the other hand there are various instances where a minor proportion of a mono-functional thiosulfate, or a thiosulfate containing more than two thiosulfate groups can be used with advantage. For example, it has been found that a mixture comprising 80 mol percent of bi-functional thiosulfate and 20 mol percent of a mono-functional thiosulfate when mixed with an alkali metal sulfide, polysulfide, or sulfhydrate and used according to the present invention gives a protective coating having exceptionally good adhesion. More generally an increase in the amount of mono-functional compound in a mixture of mono- and bi-functional compounds increases the stickiness of the resulting coating. However it usually is not desirable to use more than about 25% of the mono-functional compound since large proportions of the mono-functional compound produce a liquid product. The mono-functional and poly-functional organic thiosulfates can be prepared by methods analogous to those described above.

In addition to the organic thiosulfate and alkali metal sulfide the composition of the present invention may include a dispersing agent to promote dispersion of the polysulfide polymer particles when the composition is mixed with water and to improve the stability of the resulting suspension. The dispersing agent may be incorporated in the dry mixture and when used is preferably employed in an amount of from 0.05% to 5% by weight of the mixture.

Dispersing agents in general may be used and examples of useful dispersing agents are given in the following table.

TABLE II

1. Alkyl aryl sulfonates, e.g. butyl naphthalene sulfonate
2. Alkyl sulfates, e.g. lauryl sulfate
3. Polymerized alkyl naphthalene sulfonates
4. Polyoxyethylene ethers, e.g. polyoxyethylene ether of oleyl alcohol, polyoxyethylene ether of alkyl phenol (Emulphor On, Triton X–100, Pluronics)
5. Dioctyl sulfosuccinate
6. Sodium lignin sulfonates
7. Fatty acid esters of isethionic acid
8. Fatty acid amides of methyl taurine
9. Sodium salt of coconut fatty alcohol sulfoacetate
10. Sodium salt of alkyl phenoxyethoxy ethyl sulfate
11. Sodium salt of keryl benzene sulfonate
12. Sodium salt of petroleum sulfonates
13. Fatty acid esters of a polyether alcohol
14. Coconut fatty acid diamide of diethanolamine
15. Sorbitan monolaurate The above list includes both ionic and non-ionic types of materials. It also includes certain liquids which may have to be incorporated in an inert carrier such as bentonite before being admixed with the organic thiosulfate and alkali metal sulfide.

As previously indicated the composition described above can, if desired, be mixed with a conventional insecticide, fungicide, phytotoxic substance or animal repellent and then added to water to form a spray material which will deposit on the foliage both the insecticide, etc. and the sticky material which prevents erosion of the insecticide. Typical substances of this type are dichlorodiphenyltrichloroethane (DDT), the gamma isomer of hexachlorcyclohexane (lindane), 2-(paratertiary-butylphenoxy) isopropyl-2-chloroethyl sulfite (aramite), ferricdimethyldithiocarbamate (ferbam), the isopropyl ester of 2,4-dichlorophenoxyacetic acid (2,4D) and sulphur. In cases where the protective erosion-preventing material is mixed with the insecticide or the like in dry form, it is desirably present to the extent of 1 to 30% by weight of the mixture. The preferred composition is of the order of 90% by weight of the insecticide and 10% of the material that forms the adherent coating. As pointed out above, the insecticide or fungicide is not an essential component of the composition, since the composition may be used to apply a protective coating after the insecticide has been previously applied. It may be noted that when the present composition is used without a conventional insecticide it has inherently a moderate fungicidal action, roughly comparable to that of sulfur.

In order to point out more fully the nature of the present invention, the following specific examples are given of illustrative compositions according to the invention and methods by which they may be made.

EXAMPLE 1

143 grams (1.0 mol) of bis-beta chloroethyl ether were refluxed for 3 hours with 620 grams (2.5 mol) sodium thiosulfate pentahydrate dissolved in 1 liter of water at a temperature of 95–120° C. After 3 hours the dichlordiethyl ether had reacted, and the resulting solution was evaporated to dryness to yield a mixture of the dithiosulfates derived from bis-beta chloroethyl ether, together with sodium chloride and unreacted thiosulfate. This material dried readily and was readily pulverized to yield a fine powder.

EXAMPLE 2

A quantity of the product of Example 1 containing 5.4 grams (0.01 mol) of the organic thiosulfate was blended with 2.4 grams of commercial 70% calcium polysulfide (lime-sulfur) containing 0.01 mol of the polysulfide. blend was pulverized to pass through a 100-mesh This mixture was stable for a number of weeks temperature if kept dry. On addition of 3.5 gra blended powder to 35 cc. water, a coarse late alkylene polysulfide polymer was formed.

EXAMPLE 3

7.8 grams of the blended dithiosulfate an polysulfide obtained in Example 2 were mixed t with 0.35 gram of Darvan (a polymeric alkyl aryl sulfonate). When this mixture was added to water a much finer dispersion of the polysulfide polymer was obtained than in the case of Example 2. Similar results are obtained by use of Nacconol NRSF an alkyl aryl sulfonate) and other similar surface-active agents.

EXAMPLE 4

5.4 grams (0.01 mol) of the same dithiosulfate as obtained in Example 1 was blended with 4.8 grams (0.02 mol) of commercial 70% calcium polysulfide. Addition of 3.5 grams of this blend to 35 cc. water gave a coarse latex suspended in a liquid which was orange in color, which indicated the excess of polysulfide in solution.

EXAMPLE 5

5.4 grams (0.01 mol) of dithiosulfate derived in Example 1 from dichlordiethyl ether, was blended with 1.2 grams (0.005 mol) of commercial 70% calcium polysulfide. The resulting mixture was pulverized to pass through a 100-mesh screen. Addition of 3.5 grams of this blend to 35 cc. water gave a latex which coarsened on standing and was therefore not particularly stable. In this example the supernatant liquid was colorless.

EXAMPLE 6

5.4 grams (0.01 mol) of the dithiosulfate from dichlordiethyl ether was blended with 1.3 grams of commercial sodium monosulfide nonahydrate and the mixture finely powdered. Addition of this mixture to water resulted in the formation of a coarse latex which coagulated on standing.

EXAMPLE 7

Proceed as in Example 1 using 99 grams (1.0 mol) of ethylene dichloride in place of dichlordiethyl ether. Evaporation of the reaction liquid obtained after refluxing for several hours at a temperature of 95–120° C. gave mixture of salts containing the dithiosulfate derived from ethylene dichloride together with sodium chloride and unreacted sodium thiosulfate. This crystalline material was likewise capable of easy grinding to a fine powder.

EXAMPLE 8

5.0 grams (0.01 mol) of the dithiosulfate derived from ethylene dichloride as prepared according to Example 7 was blended with 2.4 grams (0.01 mol) of commercial 70% calcium polysulfide, and 0.25 gram of a polymeric alkyl aryl sulfonate. On addition of the mixture to water there was obtained a finely dispersed latex.

EXAMPLE 9

129 gram (0.90 mol) dichlordiethyl ether and 9.9 grams (0.10 mol) ethylene dichloride were refluxed in accordance with Example 1, for approximately 3 hours with 620 grams (2.25 mol) sodium thiosulfate at a temperature between 95–120° C. Evaporation to dryness of the resulting solution yielded a mixture of dry mixed dithiosulfates derived from the two organic halides together with sodium chloride resulting from the reaction, and unreacted sodium thiosulfate.

EXAMPLE 10

5.4 grams (0.1 mol) of the dry mixture obtained in Example 9 was blended with 3.7 grams of dry, powdered "liver of sulfur," a potassium polysulfide, and 0.3 gram of dry polymeric alkyl aryl sulfonate. Addition of 3.5 grams of this mixture, after thorough blending and pulverizing, to 35 cc. water gave a moderately well dispersed latex.

EXAMPLE 11

5.4 grams (0.01 mol) of the dry mixture as obtained in Example 9 was treated with 2.9 grams (0.03 mol) technical grade dry 60% sodium hydrosulfide and 0.5 gram of a dry polymeric alkyl aryl sulfonate. Addition to this blend to water gave a dispersion of polymeric polysulfide polymer.

From the foregoing description and examples, it should be apparent that the present invention provides a composition capable of achieving the several objectives set forth at the beginning of the present specification. The dry mixture of organic thiosulfate and alkaline sulfide, either with or without the dispersing agent and insecticide, etc., is quite stable and remains stable as long as its dry condition is maintained. (The word "dry" as used herein means the absence of free water and does not exclude the presence of combined water such as water of crystallization.) The composition is readily miscible with water at the point of use to form a fine dispersion that can be sprayed on the foliage and when so sprayed deposits a rubbery protective layer that effectively prevents either a previously applied insecticide or a component insecticide from being washed from the foliage by rain or eroded by wind, dust and the like.

Although the series of equations given above indicates that one mol of sulfide reagent is required for each mol of organic dithiosulfate, it has been found that less than one mol of the sulfide reagent can be used with advantage under certain circumstances. When the molar ratio of sulfide reagent to organic dithiosulfate is less than one, a somewhat lower molecular weight product is obtained which is stickier and can for this reason be used with advantage in some cases. The use of a molar ratio of about 0.5 is illustrated in Examples 5 and 6 above. In general it is preferable that at least 0.5 mol of sulfide reagent be used for each two $S_2O_3Na$ groups of the organic thiosulfate.

It is of course to be understood that the foregoing examples are illustrative only and that numerous changes can be made in the specific illustrative compositions disclosed without departing from the spirit of the invention as defined in the appended claims.

We claim:

1. A solid, substantially dry composition adapted to be mixed with water to form a water dispersion of polysulfide polymer, said composition comprising at least one compound having the general formula $R(S_2O_3Na)_x$ wherein "R" is selected from the group consisting of oxahydrocarbon radicals and aliphatic hydrocarbon radicals having up to ten carbon atoms, and "$x$" is a positive integer from 1 to 4, at least a major proportion of the molecules of said compounds having at least two $S_2O_3Na$ radicals attached to different carbon atoms thereof, and a reagent selected from the group consisting of alkaline monosulfides, polysulfides and sulfhydrates.

2. A solid, substantially dry composition adapted to be mixed with water and used as an agricultural spray having good adhesion to foliage, said composition comprising a mixture of compounds having the general formula $R(S_2O_3Na)_x$ wherein "R" is selected from the group consisting of oxahydrocarbon radicals and aliphatic hydrocarbon radicals having up to ten carbon atoms, and "$x$" is positive integer from 1 to 4, a major proportion of the molecules of said mixture having two $S_2O_3Na$ radicals attached to different carbon atoms thereof and a minor proportion having only one $S_2O_3Na$ radical attached to a carbon atom thereof, and a reagent selected from the group consisting of alkaline monosulfides, polysulfides and sulfhydrates.

3. A composition according to claim 1 and wherein approximately 80% of the molecules of said compounds have two $S_2O_3Na$ radicals attached thereto and approximately 20% of the molecules of said mixture have only one $S_2O_3Na$ radical attached thereto.

4. A solid, substantially dry composition adapted to be mixed with water at normal atmospheric temperatures to form a water dispersion of polysulfide polymer, said composition comprising a compound selected from the group consisting of sodium thiosulfates of aliphatic hydrocarbons having up to ten carbon atoms and oxahydrocarbons, said compound having the radical $S_2O_3Na$ attached to each of two different carbon atoms thereof, and a reagent selected from the group consisting of alkaline monosulfides, polysulfides and sulfhydrates.

5. A solid, subtsantially dry composition adapted to be mixed with water at normal atmospheric temperatures to form a water dispersion of polysulfide polymer, said composition comprising at least one compound having the general formula $R(S_2O_3Na)_x$ wherein "R" is selected from the group consisting of oxahydrocarbon radicals and aliphatic hydrocarbon radicals having up to ten carbon atoms, and "x" is a positive integer from 1 to 4, at least a major proportion of the molecules of said compounds having at least two $S_2O_3Na$ radicals attached to different carbon atoms thereof, a reagent selected from the group consisting of alkaline monosulfides, polysulfides and sulfhydrates, and from 0.05 to 5% by weight of a dispersing agent based on the dry weight of said composition.

6. A solid substantially dry composition adapted to be mixed with water and used as an agricultural spray having good adhesion to foliage, said composition being essentially composed of from 70 to 99% by weight of an insecticide and from 1 to 30% of a material adapted to inhibit removal of the insecticide from plant foliage, having the general formula $R(S_2O_3Na)_x$ wherein "R" is selected from the gorup consisting of oxahydrocarbon radicals and aliphatic hydrocarbon radicals having up to ten carbon atoms, and "x" is a positive integer from 1 to 4, at least a major proportion of the molecules of said compounds having at least two $S_2O_3Na$ radicals attached to different carbon atoms thereof, and a reagent selected from the group consisting of alkaline monosulfides, polysulfides and sulfhydrates.

7. A solid substantially dry composition adapted to be mixed wtih water and used as an agricultural spray having good adhesion to foilage, said composition comprising a compound selected from the group consisting of sodium thiosulfates of aliphatic hydrocarbons having up to ten carbon atoms and oxahydrocarbons, said compound having the radical $S_2O_3Na$ attached to each of two different carbon atoms thereof, a reagent selected from the group consisting of alkaline monosulfides, polysulfides and sulfhydrates, said reagent being present to the extent of at least 0.5 mol thereof for each two $S_2O_3Na$ groups, and from 0.005–5% by weight of a dispersing agent and from 70% to 99% by weight of an insecticide, both based on the dry weight of said composition.

8. A solid, substantially dry composition adapted to be mixed with water and used as an agricultural spray having good adhesion to foliage, said composition being essentially composed of about 90% by weight of a substance selected from the group consisting of insecticides, fungicides, phytotoxins and animal repellents and about 10% of a material adapted to inhibit removal of said substance from plant foliage, said material comprising at least one compound having the general formula $$R(S_2O_3Na)_x$$

wherein "R" is selected from the group consisting of oxahydrocarbon radicals and aliphatic hydrocarbon radicals having up to ten carbon atoms, and "x" is a positive integer from 1 to 4, at least a major proportion of the molecules of said compounds having at least two $S_2O_3Na$ radicals attached to different carbon atoms thereof and a reagent selected from the group consisting of alkaline monosulfides, polysulfides and sulfhydrates.

9. A solid, substantially dry composition adapted to be mixed with water at normal atmospheric temperatures to form a water dispersion of polysulfide polymer, said composition comprising at least one compound having the general formula $R(S_2O_3Na)_x$ wherein "R" is selected from the group consisting of oxahydrocarbon radicals and aliphatic hydrocarbon radicals having up to ten carbon atoms, and "x" is a positive integer from 1 to 4, at least a major proportion of the molecules of said compounds having at least two $S_2O_3Na$ radicals attached to different carbon atoms thereof, and a reagent selected from the group consisting of alkaline monosulfides, polysulfides and sulfyhydrates said reagent being present to the extent of at least 0.5 mol thereof for each two $S_2O_3Na$ groups.

References Cited in the file of this patent

UNITED STATES PATENTS

| | | |
|---|---|---|
| 2,252,366 | Frost | Aug. 12, 1941 |
| 2,257,607 | Jage | Sept. 30, 1941 |
| 2,363,614 | Patrick | Nov. 28, 1944 |
| 2,470,529 | Stewart | May 17, 1949 |
| 2,530,770 | Hopperstead | Nov. 21, 1950 |
| 2,600,245 | Hopperstead | June 10, 1952 |

UNITED STATES PATENT OFFICE

CERTIFICATE OF CORRECTION

Patent No. 2,925,362                  February 16, 1960

Edward M. Fettes et al.

It is hereby certified that error appears in the printed specification of the above numbered patent requiring correction and that the said Letters Patent should read as corrected below.

Column 7, line 22, after "foliage," insert -- said material comprising at least one compound --; line 24, for "gorup" read -- group --.

Signed and sealed this 11th day of October 1960.

(SEAL)
Attest:

KARL H. AXLINE
Attesting Officer

ROBERT C. WATSON
Commissioner of Patents